United States Patent
Masuda

(10) Patent No.: US 7,035,464 B2
(45) Date of Patent: Apr. 25, 2006

(54) METHOD FOR IDENTIFYING BRILLIANT MATERIAL IN PAINT

(75) Inventor: Yutaka Masuda, Fujisawa (JP)

(73) Assignee: Kansai Paint Co., Ltd., Hyogo (JP)

( * ) Notice: Subject to any disclaimer, the term of this patent is extended or adjusted under 35 U.S.C. 154(b) by 741 days.

(21) Appl. No.: 10/239,297

(22) PCT Filed: Mar. 19, 2001

(86) PCT No.: PCT/JP01/02165

§ 371 (c)(1),
(2), (4) Date: Sep. 20, 2002

(87) PCT Pub. No.: WO01/71560

PCT Pub. Date: Sep. 27, 2001

(65) Prior Publication Data

US 2003/0048942 A1 Mar. 13, 2003

(30) Foreign Application Priority Data

Mar. 21, 2000 (JP) .............................. 2000-078489

(51) Int. Cl.
*G06K 9/46* (2006.01)
*G06K 9/60* (2006.01)

(52) U.S. Cl. ...................... 382/190; 382/305

(58) Field of Classification Search ............... 382/162, 382/164, 165, 167, 190, 195, 214, 218, 305; 345/589, 629; 358/487, 515, 523, 530; 356/402
See application file for complete search history.

(56) References Cited

U.S. PATENT DOCUMENTS

| | | | |
|---|---|---|---|
| 6,741,260 B1 * | 5/2004 | Hirayama et al. | 345/589 |
| 6,750,970 B1 * | 6/2004 | Masuda | 356/402 |
| 6,781,724 B1 * | 8/2004 | Szajewski et al. | 358/487 |
| 6,959,111 B1 * | 10/2005 | Hirayama et al. | 382/167 |
| 2001/0053247 A1 * | 12/2001 | Sowinski et al. | 382/162 |
| 2002/0149602 A1 * | 10/2002 | Redpath et al. | 345/629 |
| 2002/0163640 A1 * | 11/2002 | Masuda | 356/402 |
| 2003/0048942 A1 * | 3/2003 | Masuda | 382/165 |
| 2003/0067475 A1 * | 4/2003 | Hirayama et al. | 345/589 |

FOREIGN PATENT DOCUMENTS

| | | |
|---|---|---|
| JP | 6-295318 | 10/1994 |
| JP | 7-150081 | 6/1995 |
| JP | 10-227696 | 8/1998 |
| JP | 10-324829 | 12/1998 |

* cited by examiner

*Primary Examiner*—Andrew W. Johns
*Assistant Examiner*—Amir Alavi
(74) *Attorney, Agent, or Firm*—Wenderoth, Lind & Ponack, L.L.P.

(57) ABSTRACT

Characteristic parameters of brilliant materials used for a paint color whose composition is unknown are visually extracted, an image database is retrieved by using the extracted characteristic parameters as keywords, the image of a closest single brilliant material is displayed on a monitor, and the image of the unknown-composition paint color with the image of a single brilliant material to identify the type of a brilliant material used for the unknown-composition paint color.

4 Claims, 1 Drawing Sheet

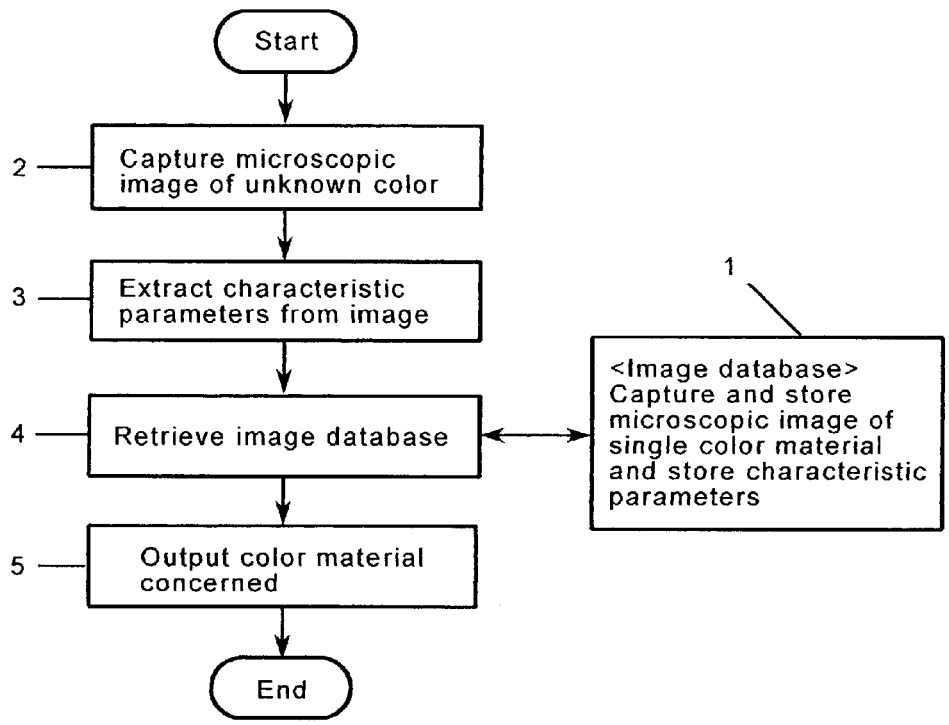
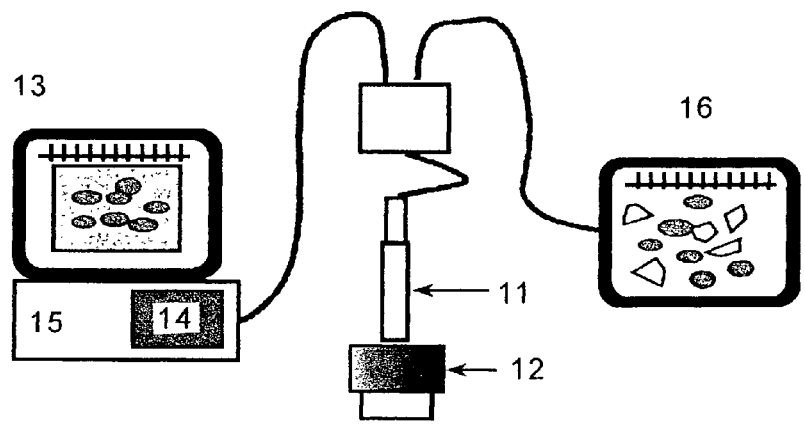

METHOD FOR IDENTIFYING BRILLIANT MATERIAL IN PAINT

TECHNICAL FIELD

The present invention relates to identification of a brilliant material contained in an unknown paint color by using an image database of brilliant materials and thereby pattern-matching characteristic parameters of the brilliant material.

BACKGROUND ART

A technique of computer color matching (abbreviated to CCM) is developed and practically used as a method for identifying a color material contained in a paint color whose composition is unknown.

However, the present CCM is a method for estimating a pain-color pigment made of only a solid pigment excluding a flaky brilliant material (aluminum flake, mica flake, or plate-like iron oxide) in accordance with spectral reflectance data, which has used a method obtained by combining Kubelka-Munks' two-luminous-flux theory, Duncan's color-mixing theory, and moreover Saunderson's surface-reflectance correction theory since many years ago.

However, CCM of a paint color containing a brilliant material is not practically used at present. This is because additivity is effectuated between lights (reflected light and coherent light) reflected from a brilliant material at highlight of a paint plate (nearby regular reflection light) but absorption of light due to a pigment occurs at the same time. Moreover, this is because coloring occurs due to absorption of light by a brilliant material and pigment in the case of shade (direction opposite to regular reflection light). That is, this is because it is impossible to theorize the coloring characteristic of a color material contained in a paint film in a wide range from highlight up to shade.

Moreover, the number of types of brilliant materials has suddenly increased in recent years. Only in the case of aluminum flake, a product whose surface is covered with an organic pigment, a product from which ion oxide is extracted through CVD, a product which is colored through anode oxidation, a product in which vacuum-deposited aluminum is covered with various metal oxides are developed one after another and a color material in which colors of highlight and shape are changed among brilliant materials is developed. The following are known as brilliant materials: approx. 100 types of aluminum flakes and approx. 300 types of mica flakes and plate-like iron oxides other than aluminum flakes.

When separating from the standpoint of color matching, a method for estimating the composition of a metallic paint color is already present. For example, in the official gazette of Japanese Patent Laid-Open No. (Hei) 7-150081 (TOYOTA), a method is disclosed in which a specified value corresponding to quantities of a color material and a brilliant material constituting a paint color is set, a reflectance decided by a designer is computed in accordance with an already-known reflectance and characteristic-value vector using an inverse estimation method according to interpolation to estimate a composition. In the case of this method, a designer obtains an imaginary color obtained by using an apparatus for computer graphic (CG) as varied-angle reflectance data and estimates a type and quantity in accordance with an already-prepared color-material database so as to match with the reflectance.

Moreover, Japanese Patent Laid-Open No. (Hei) 10-227696 discloses a method for estimating a composition by a "CCM technique" in accordance with the paint-color reflectance data. However, a specific CCM method for a metallic-paint color is not disclosed but only a general method is comprehensively disclosed.

The above two methods respectively estimate a composition by using spectral reflectance data. The spectral reflectance data is means preferable for macroscopic color-scientific measurement of a paint color but it is impossible to measure a microscopic texture containing a brilliant material. In this case, the texture denotes a texture obtained from the grain size and coloring characteristic of a brilliant material and a contained quantity of the brilliant material so that a paint color containing much large-grain-size aluminum provides "glittering" metallic feeling and a paint color containing small-grain-size aluminum provides "silky" metallic feeling. In general, most average grain sizes of brilliant materials used for paints (vehicles, construction, and industries) range between 5 and 200 μm, particularly most average grain sizes of brilliant materials used for final coating of vehicles range between 5 and 30 μm and most thicknesses of them range between 0.1 and 1.0 μm.

It is general that the measuring area of a colorimeter for measuring colors ranges between 5 and 30 mmφ but the colorimeter cannot measure micro glittering feeling.

Therefore, the present solving method is a method in which a skilled color-matching person visually selects various color materials (pigments and brilliant materials), prepare a paint while changing quantities of the color materials, and performs coating by an automatic coating machine, color-matching a macroscopic color and a microscopic texture. Because this method requires a lot of man-hours and depends on a personal ability, it is impossible to estimate and manage the time until color matching is completed.

Moreover, in the field of paint makers, color matching of paint colors whose composition is unknown prepared by a maker other than the company of its own (this is referred to as "color reproduction of other company's color) and problems of the paint colors continuously occur and therefore, development of a color-reproducing technique is a matter of life or death. In this case, the color reproduction includes not only macroscopic coloring from highlight up to shade but also matching of textures due to sizes of brilliant materials from highlight up to shade.

DISCLOSURE OF THE INVENTION

To solve the above problems, the present invention provides a method for identifying a brilliant material contained in a paint color, the method comprising:

a step of generating an image database storing an optical-microscopic image capturing the data for single brilliant materials as image data and moreover storing characteristic parameters of thee single brilliant materials as keywords;

a step of visually extracting characteristic parameters of the brilliant materials used for paint colors whose compositions are unknown; and a step of retrieving the image database by using the extracted parameters as keywords, displaying the image of the closest single brilliant material onto a monitor, and comparing the paint colors whose compositions are unknown with images of the single brilliant material whose compositions are unknown and identifying types of brilliant materials used for the paint colors whose compositions are unknown.

According to the present invention, it is possible to instantaneously display the image of a brilliant material for which it is forecasted that the brilliant material may be used with a color whose composition is unknown on a monitor from a large brilliant-material database, visually compare the image with an unknown-color microscopic image, and identify the type of the brilliant material used.

BRIEF DESCRIPTION OF THE DRAWINGS

FIG. 1 is a schematic view showing steps of a method conforming to an embodiment of the present invention; and FIG. 2 is a schematic view of an apparatus used to execute the method conforming to the embodiment of the present invention.

BEST MODE FOR CARRYING OUT THE INVENTION

[Embodiment]

An embodiment of the present invention is described below by referring to the accompanying drawings.

A method for identifying a brilliant material in a paint according to the present invention has a first step (block 1 in FIG. 1) of generating an image database, a second step (blocks 2 and 3 in FIG. 1) of extracting a characteristic parameter from an unknown brilliant material, and a third step (blocks 4 and 5 in FIG. 1) for identifying an unknown brilliant material.

In the first step, various single brilliant materials used for paint colors is photographed by a microscope at a constant magnification between 100 and 3,000 and a single-brilliant-material image database storing the image data for the photographed single brilliant materials and characteristic parameters such as grain sizes and coloring characteristics of the brilliant materials is generated by a computer.

In the second step, the optical-microscopic image of an unknown-composition paint plate 12 is captured at a constant magnification between 100 and 3,000 to display the image on a first monitor 16 with graduations, and approximate characteristic parameters such as grain sizes and coloring are visually extracted from the image.

In the third step, the characteristic parameters are transmitted to a computer 15 having a hard disk 14 storing an image database and retrieved, and the image of a corresponding single brilliant material is displayed on a second monitor 16 with graduations, the optical-microscopic images displayed on the first and second monitors 13 and 16 are visually compared each other, and the type and quantity of a color material used for an unknown-composition paint color are identified.

[Background Color]

Because an unknown-composition brilliant material is colored in various pigments, a sample prepared by only a transparent varnish is insufficient to generate a single-brilliant-material database. For example, in the case of an interference green mica pigment, a color due to interference light of green to yellowish green is exactly recognized by a microscope in a transparent varnish. However, the interference green mica in a blue pigment changes from a blue to bluish-green interference color due to a surrounding blue organic pigment. Thus, the color of a brilliant material under a microscope is influenced by the color of a surrounding organic pigment. Therefore, in the case of a sample for a single-brilliant-material database, information is insufficient only by clear. Therefore, pictures of single brilliant materials in blue, red, and block pigments are taken.

Thereby, by retrieving the picture of a single brilliant material having a hue close to an organic pigment used for an unknown paint color, the identification accuracy is improved.

A microscopic image to be stored as a database (e.g. format of JPEG) is obtained by mixing each brand of brilliant materials with four background colors such as clear (transparent), red, blue, and black. Therefore, four JEG images are generated every brand.

[Grain Size of Brilliant Material]

Grain sizes of brilliant materials are specified in accordance with the following six classes.

Very small grain size ExtraFine=Symbol EF (10 μm or less)
Small grain size Fine=Symbol F (10–15 μm)
Middle grain size Medium=Symbol M (20–25 μm)
Large grain size Coarse=Symbol C (25–30 μm)
Very large grain size Extra Coarse=Symbol C (30–50 μm)
Extremely-large grain size Ultra Coarse=Symbol UC (50 μm or more)

[Coloring Characteristic]

As coloring characteristics, the following 19 types can be used.

A) Interference silver
B) Interference green
C) Interference blue
D) Coloration gray
E) Coloration green
F) Coloration blue
G) Coloration yellow
H) Interference gold
I) Interference violet
J) Interference red
K) Coloration gold
L) Coloration kappa/bronze
M) Coloration red
N) Coloration reddish green
O) Blackish violet
P) Glass flake
Q) Others
R) Aluminum flake Coloring characteristics of brilliant materials used above are briefly described below.

The meaning of "concealment force" used for the explanation is described below. The concealment force denotes a force for concealing a substrate. The magnitude of the color difference between white and black bases of samples prepared in the above case is shown by dE of CIE LaB*. As the color difference decreases, the concealment force rises or increases. As the color difference decreases, the concealment force lowers or decreases. In general, a small concealment force (or low or bad concealment force) corresponds to a color difference of 40 or more, a medium concealment force corresponds to a color difference of 10 or more, and a large concealment force (or high or good concealment force) corresponds to a color difference of 10 or less. However, when the grain size of a brilliant material decreases, the number of brilliant materials contained in a unit quantity increases and resultantly, a concealment force increases. Therefore, a concealment force is not accurately specified by the above color-difference ranges.

A) Interference Silver

Interference silver is obtained by coating a transparent thin substrate (e.g. muscovite, synthetic phlogopite, or alumina) with titanium oxide. Because a titanium-oxide film is thin, it does not have an effect for interfering with the light of a specified wavelength. Because the difference between thicknesses of titanium-oxide films is present on a mica substrate, red, green, and blue which are three primary colors of light are made to interfere with each other in accordance with the film thickness difference and resultantly, silver (white) obtained by mixing three primary colors of light is obtained. When mixing the interference silver with clear and coating a white-black base plate with the mixture, the plate shines white on a black base and a white base. Because the substrate is transparent, the concealment force is small. Microscopically, portions shining red, green, and blue are uniformly observed in spots in a brilliant material. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth.

B) Interference Green

Interference green is obtained by coating a transparent thin substrate (e.g. muscovite, synthetic phlogopite, or alumina) with titanium oxide at a certain thickness, which makes only the light of green wavelength in white light strongly interfere. Resultantly, interference light is colored green. When mixing the interference green with clear and coating a white-black base plate with the mixture, the plate is colored green on a black base and colored reddish violet obtained by eliminating the interfering green wavelength component from white light. The concealment force is small. Microscopically, portions shining between yellowish green and green in one brilliant material are observed in spots. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth.

C) Interference Blue

Interference blue is obtained by coating a transparent thin substrate (e.g. muscovite, synthetic phlogopite, or alumina) with titanium oxide at a certain thickness, which makes only the light of blue wavelength in white light strongly interfere. Resultantly, interference light is colored blue. When mixing the interference blue with clear and coating a white-black base plate with the mixture, the plate is colored blue on a black base and colored yellow obtained by eliminating the interfering green wavelength component from white light. The concealment force is small. Microscopically, portions shining between violet and blue in one brilliant material are observed in spots. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth.

D) Coloration Gray

Coloration gray is obtained by coating a transparent thin substrate (e.g. muscovite, synthetic phlogopite, or alumina) with titanium oxide at a certain thickness to prepare interference silver and reducing the interference silver so that the oxidation order of titanium oxide becomes less than 2. As the order decreases, the coloration gray further approaches black. When mixing the coloration gray with clear and coating a white-black base plate with the mixture, the mixture is colored gray on a white-black base. The concealment force is high but it is lower than that of an aluminum flake. Microscopically, portions shining red, green, and blue in one brilliant material are uniformly observed in spots. However, because the portions are reduced, the chroma is lower than that of interference silver and some of the portions are observed gray. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth.

E) Coloration Green

Coloration green includes two types. One of them is obtained by coating a transparent thin substrate (e.g. muscovite, synthetic phlogopite, or alumina) with cobalt oxide, chromium oxide, or phthalocyanine green pigment and shows green as the color of an oxide or pigment. When mixing the coloration green with clear and coating a white-black base plate with the mixture, the mixture is colored green. The concealment force is medium. Microscopically, the entire surface of a brilliant material shows green. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth. The other of them is obtained by coating an aluminum flake with a phthalocyanine green pigment. When mixing the coloration green of this type with clear and coating a white-black base plate with the mixture, the mixture is colored green on white and black bases. Because the substrate is made of aluminum flakes, the concealment force is high. Microscopically, the entire surface of a brilliant material is uniformly green. Because aluminum is used as the substrate, the margin of the brilliant material has a protean smooth notched shape obtained by crushing atomized powder with a ball mill and expanding the powder into a thin layer in accordance with the malleability of aluminum.

F) Coloration Blue

Coloration blue includes two types. One of them is obtained by coating a transparent thin substrate (e.g. muscovite, synthetic phlogopite, or alumina) with cobalt oxide, chromium oxide, or phthalocyanine green pigment and shows blue as the color of an oxide or pigment. When mixing the coloration blue with clear and coating a white-black base plate with the mixture, the mixture is colored blue. The concealment force is medium. Microscopically, the entire surface of a brilliant material shows blue. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth. The other of them is obtained by coating an aluminum flake with a phthalocyanine green pigment. When mixing the coloration blue of this type with clear and coating a white-black base plate with the mixture, the mixture is colored blue on white and black bases. Because the substrate is made of aluminum flakes, the concealment force is high. Microscopically, the entire surface of a brilliant material is uniformly green. Because aluminum is used as the substrate, the margin of the brilliant material has a protean smooth notched shape obtained by crushing atomized powder with a ball mill and expanding the powder into a thin layer in accordance with the malleability of aluminum.

G) Coloration Yellow

Coloration yellow includes two types. One of them is obtained by coating a transparent thin substrate (e.g. muscovite, synthetic phlogopite, or alumina) with nickel oxide and shows yellow as the color of an oxide or pigment. When mixing the coloration yellow with clear and coating a white-black base plate with the mixture, the mixture is colored yellow. The concealment force is small. Microscopically, the entire surface of a brilliant material shows orange to yellow. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth. The other of them is obtained by coating an aluminum flake with an inorganic yellow pigment. When mixing the coloration yellow of this type with clear and coating a white-black base plate with the mixture, the mixture is colored yellow on white and black bases. Because the substrate is made of aluminum flakes, the concealment force is high. Microscopically, the entire surface of a brilliant material is uniformly green. Because aluminum is used as the substrate, the margin of the brilliant material has a protean smooth notched shape obtained by crushing atomized powder with a ball mill and expanding the powder into a thin layer in accordance with the malleability of aluminum.

H) Interference Gold

Interference gold is obtained by coating a transparent thin substrate (e.g. muscovite, synthetic phlogopite, or alumina) with titanium oxide at a certain thickness, which makes only the light of yellow wavelength in white light strongly interfere. Resultantly, interference light is colored yellow (=gold). When mixing the interference gold with clear and coating a white-black base plate with the mixture, the plate is colored gold on a black base and colored yellow obtained by eliminating the interfering yellow wavelength component from white light. The concealment force is small. Microscopically, portions shining between orange and gold in one brilliant material are observed in spots. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth.

I) Interference Violet

Interference violet is obtained by coating a transparent thin substrate (e.g. muscovite, synthetic phlogopite, or alumina) with titanium oxide at a certain thickness, which makes only the light of violet (components of blue and red) wavelength in white light strongly interfere. Resultantly, interference light is colored violet. When mixing the interference violet with clear and coating a white-black base plate with the mixture, the plate is colored violet on a black base and colored green obtained by eliminating the interfering violet wavelength component from white light. The concealment force is small. Microscopically, portions shining between bluish red and violet in one brilliant material are observed in spots. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth.

J) Interference Red

Interference red is obtained by coating a transparent thin substrate (e.g. muscovite, synthetic phlogopite, or alumina) with titanium oxide at a certain thickness, which makes only the light of red wavelength in white light strongly interfere. Resultantly, interference light is colored red. When mixing the interference red with clear and coating a white-black base plate with the mixture, the plate is colored red on a black base and colored bluish green obtained by eliminating the interfering red wavelength component from white light. The concealment force is small. Microscopically, portions shining between red and reddish violet in one brilliant material are observed in spots. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth.

K) Coloration Gold

Coloration gold includes two types. One of them is obtained by coating a transparent thin substrate (e.g. muscovite, synthetic phlogopite, or alumina) with iron oxide at a certain film thickness and colored gold as the color of iron oxide. When mixing the coloration gold with clear and coating a white-black base plate with the mixture, the mixture is colored gold on white and black bases. The concealment force is medium. Microscopically, portions shining between orange and yellow are observed in spots in one brilliant material. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth. The other of them is obtained by coating an aluminum flake with iron oxide at a certain film thickness and is colored gold as the color of iron oxide. When mixing the coloration gold of this type with clear and coating a white-black base plate with the mixture, the mixture is colored gold on white and black bases. Because the substrate is made of aluminum flakes, the concealment force is high. Microscopically, the entire surface of a brilliant material uniformly shines gold. Because aluminum is used as the substrate, the margin of the brilliant material has a protean smooth notched shape obtained by crushing atomized powder with a ball mill and expanding the powder into a thin layer in accordance with the malleability of aluminum.

L) Coloration Kappa/bronze

Coloration kappa/bronze includes two types. One of them is obtained by coating a transparent thin substrate (e.g. muscovite, synthetic phlogopite, or alumina) with iron oxide at a film thickness larger than that of K) Coloration gold and colored copper as the color of iron oxide. When mixing the coloration kappa/bronze with clear and coating a white-black base plate with the mixture, the mixture is colored copper on white and black bases. The concealment force is medium. Microscopically, portions shining between orange and reddish orange are observed in spots in one brilliant material. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth. The other of them is obtained by coating an aluminum flake with iron oxide at a film thickness larger than that of K) Coloration gold and colored copper as the color of iron oxide. When mixing the coloration kappa/bronze of this type with clear and coating a white-black base plate with the mixture, the mixture is colored copper on white and black bases. Because the substrate is made of aluminum flakes, the concealment force is high. Microscopically, the entire surface of a brilliant material uniformly shines copper. Because aluminum is used as the substrate, the margin of the brilliant material has a protean smooth notched shape obtained by crushing atomized powder with a ball mill and expanding the powder into a thin layer in accordance with the malleability of aluminum.

M) Coloration Red

Coloration red includes two types. One of them is obtained by coating a transparent thin substrate (e.g. muscovite, synthetic phlogopite, or alumina) with iron oxide at a film thickness larger than that of L) Coloration kappa/bronze and colored red as the color of iron oxide. When mixing the coloration red with clear and coating a white-black base plate with the mixture, the mixture is colored red on white and black bases. The concealment force is medium. In this case, "middle" denotes that the concealment force is higher than that of interference mica but it is lower than that of aluminum flake. Microscopically, portions shining between reddish orange and orange are observed in spots in one brilliant material. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth. The other of them is obtained by coating an aluminum flake with iron oxide at a film thickness larger than that of L) Coloration kappa/bronze and colored red as the color of iron oxide. When mixing the coloration red of this type with clear and coating a white-black base plate with the mixture, the mixture is colored copper on white and black bases. Because the substrate is made of aluminum flakes, the concealment force is high. Microscopically, the entire surface of a brilliant material uniformly shines copper. Because aluminum is used as the substrate, the margin of the brilliant material has a protean smooth notched shape obtained by crushing atomized powder with a ball mill and expanding the powder into a thin layer in accordance with the malleability of aluminum.

N) Coloration Reddish Green

Coloration reddish green includes two types. Each of them is obtained by uniformly coating a transparent thin substrate (e.g. muscovite, synthetic phlogopite, or alumina) with iron oxide at a certain film thickness and green interference light appears. When mixing the coloration reddish green with clear and coating a white-black base plate with the mixture, the mixture is colored green on black base and colored reddish violet obtained by eliminating green component from white light on white base. The concealment force is medium. Microscopically, portions shining between green and points shining read though the points occupy only a small area are observed in spots in one brilliant material. In the case of a brilliant material whose substrate is made of mica, the circumference of the material has a sharp-notched protean shape produced when crushed because of the cleavage characteristic of mica. In the case of a brilliant material whose substrate is made of alumina, the margin of the material has a shape of a smooth leaf of a gingko because of forming an alumina substrate through crystal growth.

O) Blackish Violet

Blackish violet uses a color material made of iron oxide as the substrate and the substrate shows colors changing from reddish violet to black as the thickness of the substrate increases. When mixing blackish violet with clear and coating a white-black base plate with the mixture, both white and black bases shows colors ranging from reddish violet to black on white and black bases. Because the color material has a large specific gravity and thus the number of color materials included in the unit weighing capacity is small, the concealment force is small. Microscopically, in the case of a brilliant material, one color between reddish violet and black is uniformly observed. The shape of the blackish violet is equilateral pentagonal because the blackish violet is obtained through crystal growth of the substrate and has a thickness. Therefore, a black shade may appear at the margin of a brilliant material.

P) Glass Flake

A glass flake is a color material using glass as the substrate. The substrate is prepared by crushing thin pieces of glass, plating the substrate with silver or coating the substrate with titanium and provided with designability. Glass flakes marketed at present have a large average grain diameter of 30 µm or more. When mixing glass flakes with clear and coating a white-black base plate with the mixture, the mixture shows almost the same color on white and black bases. Because the color material is large and therefore, the number of color materials included in the unit weighing capacity is very small and the substrate is transparent, the concealment force is almost equal to zero. Microscopically, a brilliant material has a large-curvature sharp sickle-like shape formed when breaking glass, which can be easily specified because the material is large.

Q) Others

Others include a brilliant material excluded from A) to P) and aluminum flake in S), from which optical designability such as organic microbeads cannot be expected but which shows a color material having the feeling of touch like a high-quality audio product.

R) Aluminum Flake

Aluminum flakes are used as a substrate. Aluminum flakes are obtained by crushing atomized powder with a steel ball mill, which are elliptically expanded due to the superior malleability of aluminum and the expanded aluminum flakes have a small thickness of approx. 0.6 µm. When mixing aluminum flakes with clear and coating a white-black base plate with the mixture, the mixture shows almost the same color on white and black bases. The concealment force is very high and the color difference between 45° and 0° of the white and black bases becomes 5 or less. Microscopically, an aluminum flake shines silver white at a high brightness. The margin of the aluminum flake has a protean smooth notched shape obtained by crushing atomized powder with a ball mill and expanding the powder into a thin layer in accordance with the malleability of aluminum.

Embodiments

First, a method for generating a database for a single brilliant material is described below. The single brilliant material is a brand of a color material constituting a paint color, which can be classified into an aluminum flake and mica flake.

The brilliant material is weighed by 1 g in terms of a solid content and 14 g of lacquer varnish (ACRIC 2000GL Clear made by Kansai Paint Co., Ltd.) is added to 1 g of the brilliant material to sufficiently agitate the brilliant material with a spatula (step 1).

Then, the above mixture is applied to the white-black concealment sheet according to the standard of JIS K5400 by a bar coater of No. 20 to dry the sheet at ordinary temperature (step 2).

Moreover, enamels of three primary colors are prepared which are obtained by 50%-clear-cutting primary colors of ACRIC 2000GL of red (2620GL Strong Red made by Kansai Paint Co., Ltd.), blue (2365GL First Blue made by Kansai Paint Co., Ltd.), and black (2400GL Deep Black made by Kansai Paint Co., Ltd.) (step 3).

Similarly to the case of step 1, each primary-color enamel is weighed by 14 g to 1 g of a brilliant material to sufficiently agitate it with a spatula (step 4).

Thus, a result of taking a microscopic picture of a portion on a white-black concealment sheet on which four types of colors are applied to one type of brilliant material with a video microscope (DiaZoom made by Meishin Koki Co., Ltd.) at a magnification of ×1250, analog signals of RGB are displayed on an analog monitor after passing through a controller. Moreover, the RGB analog signals are converted into digital signals of 256 gradations of each of RGB by the video capture board of a personal computer and displayed on the monitor of the personal computer. The images are stored as JPEG images having the image size according to the VGA standard of 640*480 pixels. A JPEG image is a file format adopted because it has a high file compression rate and thereby, a database requires only a small capacity. Moreover, it is possible to use a file format of a TIFF, PICT, or EPS image generally known (step 6).

The value of D50 is used as the average grain size of a brilliant material by dispersing approx. 0.2 g of the brilliant material in 50 g of toluene, unfastening them for 5 min by ultrasonic waves and measuring a grain-size distribution with a grain-size measuring instrument (Particle Analyzer 2600 made by Malvern in Germany).

The value of the average grain size is a continuous variate which is classified into five classes so as to be convenient for retrieval of the next database and their symbols are stored in a database (step 7).

Very small grain size ExtraFine=Symbol EF (10 μm or less)

Small grain size Fine=Symbol F (10–15 μm)
Medium grain size Medium=Symbol (20–25 μm)
Large grain size Coarse=Symbol M (25–30 μm)
Very large grain size Extra Coarse=Symbol EC (30–50 μm)
Extremely large grain size Ultra Coarse=Symbol UC (50 μm or more)

The coloring characteristic of a brilliant material is classified as shown below in accordance with the coloring of a brilliant material on white and black bases and the structure of the brilliant material.

A) Interference silver
B) Interference green
C) Interference blue
D) Coloration gray
E) Coloration green
F) Coloration blue
G) Coloration yellow
H) Interference cold
I) Interference violet
J) Interference red
K) Coloration gold
L) Coloration kappa/bronze
M) Coloration red
N) Coloration reddish green
O) Blackish violet
P) Glass flake
R) Aluminum flake JPEG images, grain sizes, and coloring parameters of the above single brilliant materials are stored in the hard disk (FIGS. 2–14) of the personal computer in FIGS. 2–15 as single-brilliant-material database by using the marketed database software (File Maker Pro Ver. 4.0 made by FileMaker Corp.). Any database generation software can be used as long as it is able to store images and the data for parameters of the images (step 9).

Then, a method for identifying the color material used of an unknown paint color is described below.

A paint color whose composition is unknown is photographed under the condition described for step 6 and displayed on an analog monitor attached to a microscope (step 10).

To estimate the brand of a brilliant material displayed in the image of the paint color, graduations in the image or a scale written in a transparent film on a monitor. The classified symbols described for step 7 are visually determined by referring to the scale (step 11).

Moreover, coloring of a brilliant material is visually determined by finding a brilliant material on the surface of a paint film. When using a brilliant material in the paint film, it is difficult to separate the individual coloring of the brilliant material because it is influenced by the color of a pigment (step 12).

When inputting symbols of a grain-size class and a coloring class which are parameters of the above visually-observed paint color whose composition is unknown to the image database generated in step 9, several corresponding prospective single brilliant materials are hit (step 13).

Pictures in the image database are visually determined one by one among the hit brilliant materials to search the closest one through visual pattern matching (step 14).

To further improve the accuracy, coloring of a brilliant material in colors close to background colors of clear, red, blue, and black prepared in step 6 is visually confirmed by assuming that the color of the shade in FIG. 2—2 for unknown paint color as the color of a pigment (step 15).

According to the above method, it is possible to identify types of brilliant materials included in an unknown paint color (step 16).

According to the present invention, it is possible to accurately identify a brilliant material in a short time by retrieving an optical-microscope-image database of a brilliant material prepared to estimate the composition of a paint color whose composition is unknown.

The invention claimed is:

1. A method for identifying a brilliant material contained in a paint color, comprising:
   a step of generating an image database storing an optical-microscopic image capturing the data for single brilliant materials as image data and storing characteristic parameters of the single brilliant materials as keywords for retrieval;
   a step of visually extracting characteristic parameters of a brilliant material used for a paint color whose composition is unknown; and
   a step of retrieving the image database by using the extracted characteristic parameters as keywords, displaying the image of a closest single brilliant material on a monitor, comparing the image of the unknown-composition paint color with the image of a single brilliant material, and identifying the type of a brilliant material used for the unknown-composition paint color.

2. The method according to claim 1, characterized in that the optical-microscopic image is formed by photographing the image at a certain magnification selected out of magnifications of 100 to 3,000.

3. The method according to claim 1, characterized in that characteristic parameters for retrieval.

4. The method according to claim 1, characterized in that the optical-microscopic image is formed by photographing a single brilliant material in the background of four colors such as clear, red, blue, and black.

* * * * *